UNITED STATES PATENT OFFICE.

SERVAAS DE JONG, OF PARIS, FRANCE.

IMPROVEMENT IN PURIFYING AND SOFTENING WATER.

Specification forming part of Letters Patent No. 58,961, dated October 16, 1866.

*To all whom it may concern:*

Be it known that I, SERVAAS DE JONG, of Paris, France, have invented certain Improvements in Purifying and Softening Water; and I do hereby declare the following to be a full, clear, and exact description of the manner in which the same is carried into effect.

To the water to be purified I add silicate of soda and carbonate of soda or other agent which will precipitate lime. The whole is then thoroughly agitated and allowed to stand for several days, when the water may be withdrawn for use.

To ascertain the proportion of silica in the silicate of soda and of carbonate of soda or other substance substituted for the same, which is necessary to soften and purify any kind of water, it is requisite, in the first place, to ascertain by the proving apparatus of Dr. Clark the degree of hardness of the water and the proportion of magnesia contained in the same. When this is determined, I add to each hectoliter of water three grams of anhydrous carbonate of soda for each ascertained degree of hardness of the water and three grams of silica for each gram of magnesia the volume of water contains.

A composition for purifying ordinary hard water may be made as follows: Anhydrous carbonate of soda, two parts; bicarbonate of soda, one part; liquid silicate of soda of a specific gravity of 1.550, two parts.

The bicarbonate and carbonate of soda, reduced to fine powder, are first mixed intimately with the liquid silicate of soda, and the composition is allowed to rest for about twenty-four hours, when it will be sufficiently hard to be pulverized.

The composition may be heated sufficiently to remove every trace of humidity, and can be readily pulverized by any suitable appliances.

When the water is unusually hard I add, for four and a half liters of water and for each ascertained degree of hardness 0 gr. 1294 to 0 gr. 1620 of the mixed carbonate of soda. I also calculate the quantity of magnesia contained in four and one-half liters of water, and use for each degree of magnesia 0 gr. 3889 of silicate of soda.

When the water is heated, four hundred and fifty liters may be softened by from five hundred and fifty to six hundred and seventy-eight grams of the composition. These quantities however will vary with the nature of the water to be acted on.

If desired, soap may be added to the water after the latter has been purified.

I can substitute for the above-mentioned carbonate of soda other equivalent salts, and the silicate of soda may be of a different density from that mentioned. One of the carbonates of soda may in some cases be dispensed with in forming the composition.

When another material is substituted for carbonate of soda the quantity of such material should be greater or less than the quantity of carbonate of soda required, accordingly as the material used is stronger or weaker than the carbonate of soda.

Without confining myself to the exact proportions of the ingredients herein mentioned, I claim as my invention and desire to secure by Letters Patent—

Purifying and softening water by silicate of soda and carbonate of soda, or its equivalent, as set forth.

In testimony whereof I have signed my name to this specification before two subscribing witnesses.

SERVAAS DE JONG.

Witnesses:
L. BISNARD,
F. F. RANDOLPH.